United States Patent [19]

Rood, Jr.

[11] 4,435,947

[45] Mar. 13, 1984

[54] TOWED COTTON RETRIEVING BELT ASSEMBLY

[76] Inventor: William E. Rood, Jr., 3134 E. Fargo Cir., Mesa, Ariz. 85203

[21] Appl. No.: 311,984

[22] Filed: Oct. 16, 1981

[51] Int. Cl.³ ............................................ A01D 45/18
[52] U.S. Cl. ...................................................... 56/28
[58] Field of Search ......................... 56/28, 49, 328 R; 198/694, 654, 510; 171/63, 61

[56] References Cited

U.S. PATENT DOCUMENTS 3,408,799 11/1968 Jennings .................................. 56/28

FOREIGN PATENT DOCUMENTS 686668 10/1979 U.S.S.R. .................................. 56/28

*Primary Examiner*—Jay N. Eskovitz
*Attorney, Agent, or Firm*—Cahill, Sutton & Thomas

[57] ABSTRACT

A cotton retrieving device includes a slotted cotton retrieving belt supported in an eliptical configuration by an upper pulley and a lower pulley. The upper and lower pulleys are rotatably supported by a first member. A rearward and lower end of a second member for pulling the cotton retrieving device is attached to the first member. A forward and upper end of the second member is pivotally connected to a frame member at a pivot point located substantially in front of and above the axis of the lower pulley. The axis of the upper pulley is parallel to and located above the axis of the lower pulley, so that a major axis of the eliptical configuration of the retrieving belt is inclined at a predetermined angle with respect to the direction of travel of the cotton retrieving device so that the slotted cotton retrieving belt will open and then close upon tufts of cotton laying on the ground.

17 Claims, 5 Drawing Figures

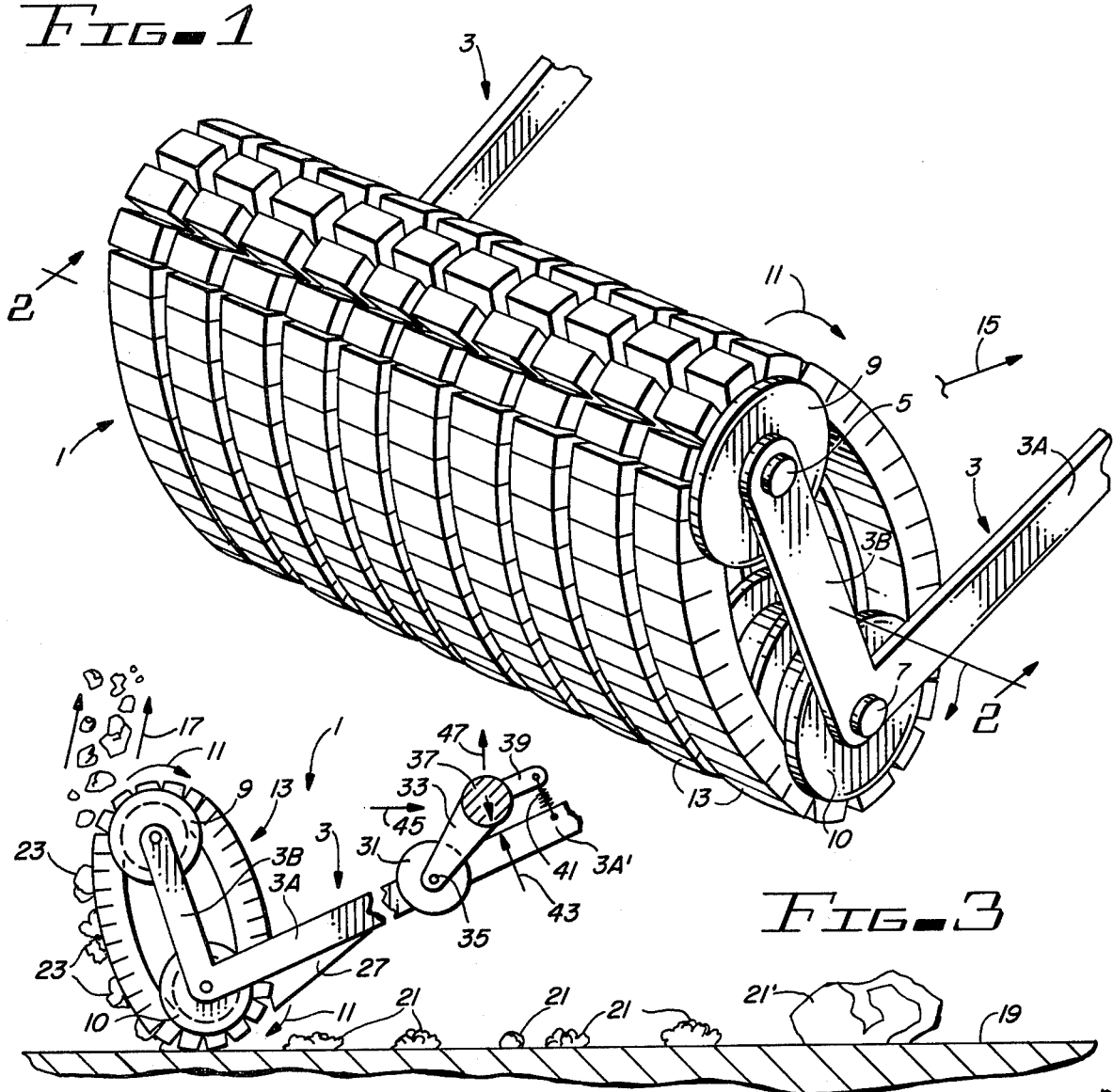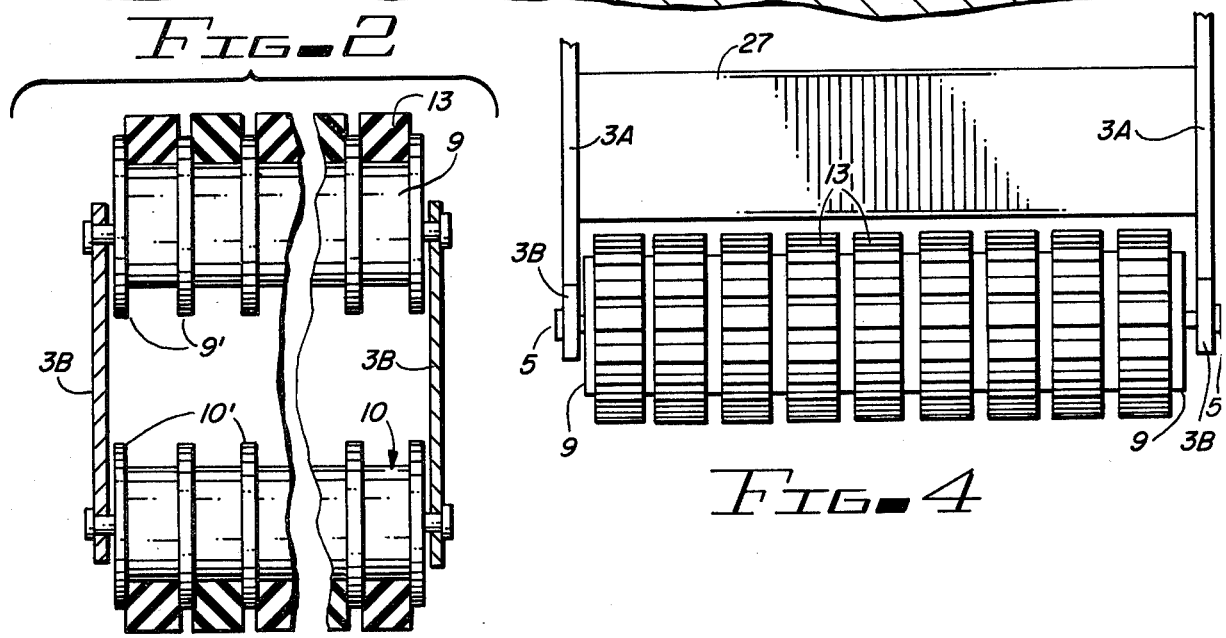

TOWED COTTON RETRIEVING BELT ASSEMBLY

BACKGROUND OF THE INVENTION

1. Field of the Invention

The invention relates to machines for retrieving "down" cotton (which has fallen onto the ground and is not harvestable by conventional cotton harvesting machines), and more particularly, to slotted belt cotton retrieving devices which are pulled, rather than pushed, along the ground on which "down" cotton lies.

2. Description of the Prior Art

Numerous cotton retrieving machines and techniques have been previously implemented, patented, and marketed by the present inventor. The cotton retrieving systems referred to all have utilized transversely slotted retrieving belts which pass over the ground wherein, loose pieces of cotton, sometimes referred to as "ground cotton" or "down cotton", have fallen due to various causes, including weather conditions, other farm machinery, etc. The transversely slotted retrieving belts pass around upper and lower pulleys, causing the transverse slots to open and then close upon and grasp loose pieces of cotton as the retrieving belts contact the ground surface. The grasped cotton is lifted from the ground and transported by the retrieving belts toward the upper pulley supporting the transversely slotted belt; the transverse slots again open, releasing the pieces of retrieved cotton. Various mechanisms for receiving the released cotton and cleaning it have been utilized. For more information on such cotton retrieving machines and techniques, see U.S. Pat. Nos. 3,305,898, 3,173,544, 3,342,310, 3,399,767 3,467,991, 3,164,027, 3,399,518, 3,425,097, 3,382,544 and 2,670,584.

Although the above-mentioned cotton retrieving machines and techniques have been commercially very successful, the present state of the art has resulted from a generally continuous series of efforts to improve the efficiency of "down" cotton retrieving techniques and machines and to improve the cleanliness of the cotton retrieved thereby, and further, to reduce the cost and complexity of such "down" cotton retrieving machines and techniques.

Accordingly, it is an object of the invention to provide further improved cotton retrieving machines and techniques utilizing transversely slotted cotton retrieving belts by reducing the cost and complexity of such machines and techniques.

The known prior cotton retrieving devices all have utilized pulley assemblies for supporting the slotted retrieving belts, wherein the pulley assemblies are attached to and supported by an arm which was pivotally connected at a free end thereof to a frame member of the main body of a ground cotton retrieving machine. The pulley assemblies are pushed along the ground by means of the arm. As the earliest such pulley assemblies were pushed by the main body of the cotton retrieving machine, frictional contact between a lower portion of the elongated retrieving belts caused the retrieving belts and supporting pulleys to turn. These devices generally worked well except when exceptionally soft ground was encountered or unless relatively large rocks or lumps of dirt were encountered. In either event, there was a tendency for the portions of the retrieving belts contacting the soft ground or relatively large obstacles to begin "burrowing" or become pushed or wedged into the soft ground or to become blocked by the obstacle. This would frequently cause jamming and stopping of the entire ground cotton retrieving machine, thereby causing considerable inconvenience. Subsequently, this problem was substantially overcome by supplying rotational power to pulleys supporting the retrieving belts enabling the retrieving belts to "climb over" large obstacles and effectively move over soft ground. This solution has been very effective and has been utilized for many years, but adds considerably to the cost and complexity of the slotted belt supporting assemblies.

Therefore, another object of the invention is to provide an improved ground cotton retrieving belt support assembly which avoids the need for providing rotational power to pulleys which support retrieving belts, and efficiently functions on exceptionally soft ground and readily moves over large obstacles, such as rocks and large dirt in the path of the retrieving belts.

SUMMARY OF THE INVENTION

Briefly described, and in accordance with one embodiment thereof, the invention provides a towed cotton retrieving assembly including a plurality of transversely slotted cotton retrieving belts, the retrieving belts being supported by an upper pulley and a lower pulley which is parallel to the upper pulley. The upper pulley and the lower pulley are supported by a pulley support member. A towing member has one end connected to the pulley support member and a free end portion pivotally connected to a frame member of a cotton retrieving machine which tows the cotton retrieving assembly. The point of pivotal connection of the free end portion of the towing member is located substantially in front of and higher, relative to a ground surface contacting lower portions of the retrieving belts, than the axis of the lower pulley, so that as the assembly is towed, both a forward component of force and an upward component of force are exerted on the pulley support member. The forward and upward components of force enable the retrieving belts to pass over relatively large obstacles without much tendency to "burrow under" the obstacles and also allow efficient movement of the retrieving belts over exceptionally soft ground with reduced or no tendency of the retrieving belts to burrow into the soft ground even though rotational power is not applied to either the upper pulley or the lower pulley. In one embodiment of the invention, spring biasing means are provided to exert an additional downward force on the retrieving belt to increase the efficiency of the retrieving belt in grasping tufts of cotton laying on the ground and to provide additional frictional contact between the ground and the retrieving belts to prevent undue slippage between the ground and the retrieving belts. In another embodiment of the invention, a slide plate or wheel is attached to the towed assembly to encounter obstacles in the path of travel of the retrieving belts and begin lifting of the cotton retrieving assembly before the retrieving belts thereof strike the obstacle. In the described embodiments of the invention, the axes of the upper and lower pulleys lie in a plane which is inclined at a predetermined angle relative to the direction of travel of the towed assembly to allow proper opening and closing of the transverse slots of the retrieving belts to effect proper grasping and releasing of pieces of "down" cotton.

BRIEF DESCRIPTION OF THE DRAWINGS

FIG. 1 is a partial perspective view of the slotted belt cotton retrieving assembly of the present invention.

FIG. 2 is a section view taken along section line 2—2 of FIG. 1.

FIG. 3 is a side view diagram useful in explaining the operation of the device of FIG. 1.

FIG. 4 is a top view of the device of FIG. 1.

DESCRIPTION OF THE INVENTION

Figure 3A:
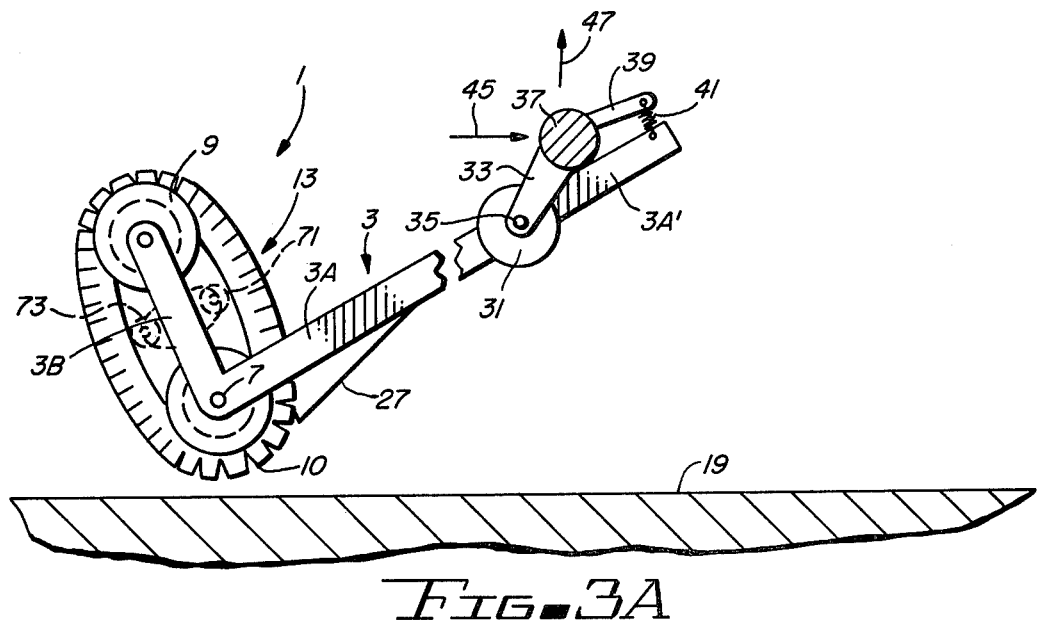
FIG. 3A is a side view diagram useful in further explaining the device of FIG. 1.

Referring now to the drawings, an operative retrieving assembly of a "ground cotton" retrieving machine is shown, and is designated by reference numeral 1. Assembly 1 includes a plurality of slotted retrieving belts 13. Retrieving belts 13 are of the type described in the above-mentioned patents, which are incorporated hereby by reference. Retrieving belts 13 are supported in a generally eliptical configuration by an upper pulley 9 and a lower pulley 10. Upper pulley 9 is rotatably supported on an axle 5. Axle 5 is supported by a pulley support member 3B. Lower pulley 10 is rotatably supported on a lower axle 7. Lower axle 7 is parallel to upper axle 5, and is supported by the lower end of pulley support member 3B.

A towing member 3A is rigidly attached to the lower portion of pulley support member 3B and extends forward at approximately a right angle from member 3B.

As assembly 1 moves along a ground surface 19 (FIG. 3) in a forward travel direction indicated by arrow 15 (FIG. 1) frictional contact between the ground surface 19 and the lower portions of retrieving belts 13 causes retrieving belts 13 to "rotate" in the direction indicated by arrows 11.

As best seen in FIGS. 2 and 4, assembly 1 contains two substantially L-shaped members 3, each including a member 3A for towing the assembly and a member 3B for supporting opposite ends of axles 5 and 7.

As best seen in FIG. 3, member 3A is substantially inclined relative to ground surface 19 when assembly 1 is being towed. The upper, right-hand end of member 3A is designated by reference numeral 3A'. Member 3A is pivotally connected by means of pin 35 to a rigid support member 33. Support member 33 is rigidly attached to a horizontal support bar 37. Support bar 37 is rigidly attached to a frame member (not shown) of a machine that tows assembly 1. Typically, the machine may tow a number of assemblies such as 1, each of which is similarly connected to support bar 37. The frame member to which support bar 37 is rigidly attached moves support bar 37 in the direction indicated by arrow 45 in FIG. 3, causing assembly 1 to be towed in the direction indicated by arrow 45. As the retrieving belts encounter irregularities in the ground surface 19, the retrieving belt assembly 1 moves up and down. As the assembly moves up and down over irregularities on ground surface 19, arm member 3A pivots about pivot point 35. Note that when assembly 1 is being towed, support bar 37 does not rotate, nor does support member 33.

The above-mentioned frame member can be lifted, under control of the operator of the towing machine, thereby causing support bar 37 to move vertically upward in the direction indicated by arrow 47 in FIG. 3. As support bar 37 is lifted, arm 3A pivots about pivot pin 35, causing the gap designated by arrows 43 to decrease until the bottom surface of support bar 37 abuts the upper surface of portion 3A' of member 3A.

At this point, member 3A can pivot no further, and further vertical lifting of support bar 37 in the direction indicated by arrow 47 causes the entire retrieving assembly 1 to be lifted off of ground surface 19 as shown in FIG. 3A.

It should be noted that retrieving assembly 1 also can be lifted off of the ground surface 19 by clockwise rotation rather than lifting of support bar 37.

In the event that the weight of assembly 1 is not deemed great enough to ensure adequate pressure and traction between the individual slotted belts 13 and ground surface 19, a means for providing an additional downward "bias" force is provided. More specifically, member 39 is rigidly attached to support bar 37 and extends upward and to the right of bar 37, as shown in FIG. 3. A tension spring 41 is connected between the free end of member 39 and the free end of portion 3A' of member 3A, thereby forcing the free end of member 3A' upward and consequently forcing the lower end of member 3A downward. This, of course, increases the pressure and traction between slotted belts 13 and ground surface 19.

In one embodiment of the invention, each single L-shaped member such as 3 supports only two retrieving belts such as 13 that are disposed on opposite sides of member 3B by suitable mounted upper pulleys such as 9 and lower pulleys such as 10. Each such L-shaped member (supporting one pair of slotted retrieving belts) is independently suspended by means of a pivot pin such as 35 and a pair of members such as 33 rigidly attached to support bar 37 and supporting the pin 35 on opposite sides of the member 3A. In this instance, it is advantageous to provide a pair of flat, parallel stabilizing plates, such as 31, on opposite sides of the member 3A. The stabilizing plates 31 in this case slide against the inner surface of the support members 33 and thereby prevent sideways wobbling of the assembly.

As indicated in FIGS. 3 and 4, a slide plate 27 is attached to the lower portions of towing members 3A. As assembly 1 is pulled along ground surface 19 and encounters a relatively large obstacle or rock 21', guard plate 27 will strike rock 21'. Since pivot pin 35 is located higher than lower axle 7 there is both a forward component of force and an upward component of force applied to assembly 1 as it is towed along ground surface 19. When the bottom surface of slide plate 27 strikes rock 21', assembly 1 is easily and smoothly lifted upward by the sliding action of slide plate 27 on rock 21' as assembly 1 moves forward thereby reducing any tendancy for assembly 1 to "burrow" or become blocked as the forward surface of retrieving belts 13 strike rock 21'.

Figure 3B:
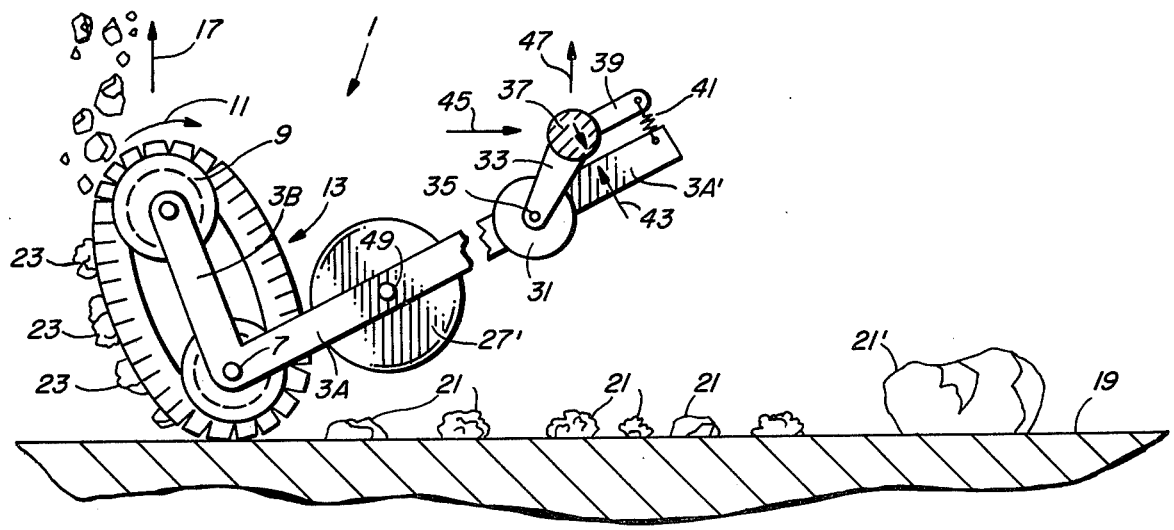
FIG. 3B is a side view diagram of another embodiment of the invention.

As an alternative to providing the above-mentioned slide plate 27, a suitable rotating cylinder or wheel can be installed on the members 3A, as shown in FIG. 3B. In FIG. 3B, reference numeral 27' illustrates such a cylinder mounted on an axle 49. Axle 49 is supported between two members such as 3A. In the above-mentioned embodiment of the invention wherein a pair of retrieving belts 13 is disposed on opposite sides of an independently suspended L-shaped member 3, a pair of wheels could be installed on axle 49 on opposite sides of the member 3A of that L-shaped member 3. The drum cylinder or wheel 27' will encounter a large obstacle such as 21' as the retrieving assembly moves in the direction of arrow 45, and will begin lifting the retrieving belt above the surface of ground 19 in order to facilitate passing of the retrieving belts 13 over the obstacle 21'.

In FIG. 3, reference numbers 21 designate pieces of "down" cotton to be retrieved by assembly 1. Reference numeral 23 designates pieces of "down" cotton which have been grasped by transverse slots when they open as retrieving belts 13 pass around lower pulley 10 to grasp the pieces of cotton 21 on the ground and close thereon and then lift them as the trailing portion of retrieving belts 13 travel from lower pulley 10 to upper pulley 9. As the upper portions of retrieving belts 13 pass around upper pulley 9, the transverse slots open, tossing retrieved cotton 23 upward as indicated by arrow 17. (Various suitable receiving and cleaning devices known in the art are capable of collecting the upwardly tossed pieces of retrieved cotton 23, and are not described herein).

In a present embodiment of the invention, the diameters of upper and lower pulleys 9 and 10 are approximately four and one-half inches. The width of each of retrieving belts 13 is two inches, and the center-to-center spacing of retrieving belts 13 is two and three-fourths inches. The thickness of each retrieving belt 13 is approximately one inch. The height of assembly 1 is approximately fourteen and one-half inches. The distance between the axes of upper and lower axles 5 and 7 is approximately eight inches. The length of each of towing members 3A is approximately thirty-four inches, and the elevation of hinge point 35 above ground surface 19 is approximately twenty inches. The rearward inclination of members 3B, measured relative to a line perpendicular to ground surface 19, is approximately twenty-two degrees (i.e., 112° with respect to the above mentioned forward direction). The eliptical configuration of retrieving belts 13, as they are supported on upper and lower pulleys 9 and 10, is explained in above-mentioned U.S. Pat. No. 3,399,767, although the range of ratios of the major and minor eliptical axis (described in the foregoing patent) is somewhat broader for the present application than the range set forth in U.S. Pat. No. 3,399,767.

The foregoing assembly has been found to work more easily than the prior art in soft ground and when large obstacles (such as rock 21' or large clumps of dirt) are encountered even if no "rotational" power is applied to either of upper and lower pulleys 9 and 10. It is therefore believed that the assembly described herein constitutes a significant advance in slotted-belt type cotton retrieving machines because the cost of providing mechanisms to effect rotation of pulleys supporting the retrieving belts can be avoided. Another significant advantage to the described embodiment of the invention is that shorter length retrieving belts can be used with less tendancy to burrow into soft ground than is the case for the prior art.

While the invention has been described with reference to a particular embodiment thereof, those skilled in the art will be able to make various modifications to the described embodiment without departing from the true spirit and scope of the invention. For example, the configuration and dimensions of the retrieving belts and pulleys need not be precisely as described. The pulleys and retrieving belts can be independently suspended in certain applications wherein very uneven ground is generally encountered. It is not necessary that the member 3A be connected at the lower portion of 3B; it can be connected to any other portion of member 3B. Although a rearward inclination of member 3B often will be advantageous, the disclosed device is capable of retrieving down cotton even if members 3B are vertical or even inclined forward. In some instances, it may be advantageous to use retrieving belts of increased thickness to achieve a "rounder" eliptical configuration with a lower ratio of its major axis to its minor axis than is indicated in the drawings. It may also be advantageous to use "idler" rollers, as indicated by dotted lines 71 in FIG. 3A and possibly also a trailing idler roller as indicated by dotted lines 73 in FIG. 3A to maintain such a "rounder" eliptical configuration. The more rounded configuration will move over obstacles and holes more easily.

I claim:

1. A cotton retrieving device comprising in combination:
   (a) a retrieving belt, said retrieving belt being transversely slotted;
   (b) upper pulley means for supporting said retrieving belt, said upper pulley means having a first axis;
   (c) a lower pulley means for supporting said retrieving belt, said lower pulley means having a second axis parallel to said first axis;
   (d) pulley support means for supporting said upper pulley means and said lower pulley means; and
   (e) towing means connected to said pulley support means for effecting towing of said pulley support means along a ground surface, said towing means having a forward portion for connection to a pulling means at a point outside of the area circumscribed by said retrieving belt and substantially in front of said retrieving belt, said towing means also having a rear portion connected to said pulley support means for towing said pulley support means and for holding said first axis and said second axis in a plane which remains approximately at a predetermined non-parallel angle with respect to said ground surface as said cotton retrieving device is towed along said ground surface.

2. The cotton retrieving device of claim 1 wherein said forward portion of said towing means is pivotally connected to a frame member to effect towing of said cotton retrieving device so that said retrieving belt rolls along a ground surface.

3. The cotton retrieving device of claim 2 wherein said forward portion of said towing means is pivotally connected in front of said pulley support means at a substantially greater distance above said ground surface than said second axis.

4. The cotton retrieving device of claim 3 wherein said predetermined angle is approximately 112° with respect to the forward direction of the cotton retrieving device.

5. The cotton retrieving device of claim 3 wherein said upper pulley means and said lower pulley means are spaced apart so that said retrieving belt assumes an approximately eliptical configuration as said retrieving belt passes around said upper pulley means and said lower pulley means.

6. The cotton retrieving device of claim 3 wherein said pulley support means and said towing means are implemented by means of a pair of approximately L-shaped members each having first and second legs, each of said first legs having an upper portion for engaging said upper pulley means to rotatably support said upper pulley means, each of said first legs having a lower portion for engaging said lower pulley means to rotatably support said lower pulley means, each of said second legs having a rear portion connected to said lower portion of a corresponding one of said first legs, each of said second legs having a forward portion pivotally connected to said frame member.

7. The cotton retrieving device of claim 3 further including downward force exerting means for causing a predetermined downward force to be exerted on said ground surface by a portion of said retrieving belt contacting said ground surface to ensure sufficient traction of said retrieving belt with said ground surface to cause said belt to rotate around said pulleys and pick up pieces of cotton on said ground as said cotton retrieving device moves in said forward direction.

8. The cotton retrieving device of claim 7 wherein said downward force exerting means includes spring means connected to said towing means and said frame member for effecting said causing of said downward force.

9. The cotton retrieving device of claim 3 including a plurality of retrieving belts supported by said upper pulley means and said lower pulley means.

10. The cotton retrieving device of claim 9 wherein said cotton retrieving device includes five retrieving belts supported by said upper pulley means and said lower pulley means.

11. The cotton retrieving device of claim 3 wherein the diameter of said lower pulley means is approximately four and one-half inches.

12. The cotton retrieving device of claim 1 wherein the distance between said first and second axis is approximately eight inches.

13. The cotton retrieving device of claim 3 wherein said frame member can be lifted by a machine to which said cotton retrieving device can be connected, and wherein said frame member is positioned to engage said towing means to prevent pivoting of said towing means as said frame member is lifted, causing said pulley support means and said retrieving belt to be lifted above the ground surface.

14. The cotton retrieving device of claim 3 wherein said frame member can be rotated by a machine to which said cotton retrieving device can be connected, and wherein said frame member is positioned to engage said towing means to prevent pivoting of said towing means as said frame member is rotated, causing said pulley support means and said retrieving belt to be lifted above the ground surface.

15. The cotton retrieving device of claim 5 further including an idler means connected to said pulley support means between said upper pulley means and said lower pulley means for engaging said retrieving belt to maintain the leading portion of said retrieving belt between said upper pulley means and said lower pulley means in a more rounded configuration than would occur as a result of elasticity of the outer portion of said retrieving belt.

16. The cotton retrieving device of claim 15 wherein said idler means includes an idler roller that contacts the inner surface of said retrieving belt.

17. A cotton retrieving device comprising in combination:
(a) a retrieving belt, said retrieving belt being transversely slotted;
(b) upper pulley means for supporting said retrieving belt, said upper pulley means having a first axis;
(c) a lower pulley means for supporting said retrieving belt, said lower pulley means having a second axis parallel to said first axis;
(d) pulley support means for supporting said upper pulley means and said lower pulley means; and
(e) forward movement means connected to said pulley support means for applying a forward force to said pulley support means to cause forward movement of said lower pulley support means and said retrieving belt supported thereby along a ground surface and for causing a rearward, upward translation of said pulley support means relative to said forward movement means in response to a rearward force produced on said retrieving belt and said lower pulley means by an obstacle in the path of said retrieving belt when said retrieving belt encounters said obstacle while moving forward, said rearward, upward translation of said pulley support means causing said lower pulley support means and said retrieving belt supported thereby to tend to roll up over said obstacle rather than to push its way down and against said obstacle, wherein said pulley support means includes means for holding said first axis and said second axis in a plane that remains at an approximately constant obtuse angle relative to the direction of travel of said cotton retrieving device along the ground.

* * * * *